United States Patent
Barbieri et al.

(10) Patent No.: US 9,642,147 B2
(45) Date of Patent: May 2, 2017

(54) METHODS AND APPARATUS FOR EVALUATING NUMBER OF PROTECTED ACTIVE USERS BASED ON QOS REQUIREMENTS, THROUGHPUT AND TRAFFIC

(75) Inventors: Alan Barbieri, San Diego, CA (US); Ajay Gupta, San Diego, CA (US); Vikas Jain, San Diego, CA (US); Osok Song, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 251 days.

(21) Appl. No.: 13/372,303

(22) Filed: Feb. 13, 2012

(65) Prior Publication Data
US 2012/0207025 A1    Aug. 16, 2012

Related U.S. Application Data

(60) Provisional application No. 61/442,670, filed on Feb. 14, 2011.

(51) Int. Cl.
| | | |
|---|---|---|
| H04W 4/00 | (2009.01) | |
| H04W 72/08 | (2009.01) | |
| H04L 1/20 | (2006.01) | |
| H04W 24/02 | (2009.01) | |
| H04W 72/04 | (2009.01) | |
| H04W 72/00 | (2009.01) | |
| H04W 92/20 | (2009.01) | |

(52) U.S. Cl.
CPC ............ *H04W 72/082* (2013.01); *H04L 1/20* (2013.01); *H04W 24/02* (2013.01); *H04W 72/00* (2013.01); *H04W 72/0426* (2013.01); *H04W 92/20* (2013.01)

(58) Field of Classification Search
CPC ...... H04W 28/08; H04W 24/00; H04W 72/04
USPC ................................................. 370/332, 277
See application file for complete search history.

(56) References Cited

U.S. PATENT DOCUMENTS

| | | | | |
|---|---|---|---|---|
| 5,548,812 | A | * | 8/1996 | Padovani et al. ............. 455/442 |
| 5,574,983 | A | * | 11/1996 | Douzono .............. H04W 52/40 455/442 |

(Continued)

FOREIGN PATENT DOCUMENTS

| | | |
|---|---|---|
| WO | WO-2008045781 | 4/2008 |
| WO | WO-2010138925 A1 | 12/2010 |

(Continued)

OTHER PUBLICATIONS

Zubin et al. ( Dynamic Resource Partioning Femto-to-Macro Cell Interference Avoidance, Apr. 2010), pp. 1-12.*

(Continued)

*Primary Examiner* — Ricky Ngo
*Assistant Examiner* — Dewanda Samuel
(74) *Attorney, Agent, or Firm* — Patterson & Sheridan, L.L.P.

(57) ABSTRACT

Certain aspects of the present disclosure propose methods and apparatus to transmit information about number of active UEs in a cell (e.g., pico cell) that need protection to an interfering cell (e.g., a macro cell). The information may be transmitted in a resource status update message. The active users may be defined as users whose downlink performance and/or quality of service are limited by the available number of protected resources.

38 Claims, 8 Drawing Sheets

(56) References Cited

U.S. PATENT DOCUMENTS

| | | | |
|---|---|---|---|
| 6,438,376 B1* | 8/2002 | Elliott et al. | 455/437 |
| 6,674,456 B2* | 1/2004 | Miyazaki | 347/171 |
| 7,069,009 B2* | 6/2006 | Li et al. | 370/329 |
| 8,086,180 B2* | 12/2011 | Chiu et al. | 455/63.1 |
| 8,126,403 B2* | 2/2012 | Wang Helmersson et al. | 455/63.1 |
| 8,265,685 B2* | 9/2012 | Vikberg et al. | 455/525 |
| 8,280,396 B2* | 10/2012 | Bachl et al. | 455/453 |
| 8,300,533 B2 | 10/2012 | Malladi et al. | |
| 8,401,544 B2* | 3/2013 | Fried et al. | 455/425 |
| 8,412,256 B2* | 4/2013 | Lee et al. | 455/522 |
| 8,423,008 B2* | 4/2013 | Pedersen et al. | 455/418 |
| 8,428,602 B2* | 4/2013 | Guvenc et al. | 455/444 |
| 8,437,743 B2* | 5/2013 | Olsson et al. | 455/411 |
| 8,447,344 B2* | 5/2013 | Ratasuk et al. | 455/522 |
| 8,467,339 B2* | 6/2013 | She et al. | 370/329 |
| 8,705,506 B2* | 4/2014 | Khandekar | H04W 72/082 370/341 |
| 2005/0254555 A1* | 11/2005 | Teague | H04B 1/715 375/136 |
| 2005/0277425 A1* | 12/2005 | Niemela | H04W 52/40 455/452.2 |
| 2008/0161013 A1* | 7/2008 | Friman | 455/456.1 |
| 2008/0240030 A1* | 10/2008 | Kolding et al. | 370/329 |
| 2009/0131065 A1* | 5/2009 | Khandekar et al. | 455/452.1 |
| 2009/0197629 A1* | 8/2009 | Borran et al. | 455/522 |
| 2009/0197631 A1* | 8/2009 | Palanki et al. | 455/522 |
| 2009/0247084 A1* | 10/2009 | Palanki | H04L 5/0007 370/329 |
| 2009/0252077 A1* | 10/2009 | Khandekar | H04W 72/082 370/312 |
| 2009/0257390 A1* | 10/2009 | Ji | H04W 72/082 370/329 |
| 2009/0290550 A1* | 11/2009 | Bhattad | H04W 72/0406 370/329 |
| 2010/0061317 A1* | 3/2010 | Gorokhov | H04W 52/243 370/329 |
| 2010/0135235 A1 | 6/2010 | Ji et al. | |
| 2010/0246533 A1 | 9/2010 | Lundin et al. | 370/332 |
| 2010/0273481 A1* | 10/2010 | Meshkati et al. | 455/435.1 |
| 2011/0044259 A1 | 2/2011 | Nimbalker et al. | |
| 2011/0105135 A1* | 5/2011 | Krishnamurthy | H04W 16/10 455/450 |
| 2011/0117967 A1* | 5/2011 | Vedantham et al. | 455/561 |
| 2011/0149894 A1 | 6/2011 | Luo et al. | |
| 2011/0170496 A1* | 7/2011 | Fong et al. | 370/329 |
| 2011/0201367 A1* | 8/2011 | Aminaka et al. | 455/501 |
| 2011/0275394 A1 | 11/2011 | Song et al. | |
| 2011/0319066 A1* | 12/2011 | Chou | H04W 36/0077 455/422.1 |
| 2012/0165064 A1* | 6/2012 | Koutsimanis et al. | 455/524 |

FOREIGN PATENT DOCUMENTS

| | | |
|---|---|---|
| WO | WO2011122833 A2 | 10/2011 |
| WO | WO2011130438 | 10/2011 |

OTHER PUBLICATIONS

"3rd Generation Partnership Project; Technical Specification Group Radio Access Network; Evolved Universal Terrestrial Radio Access (E-UTRA) ; Layer 2—Measurements (Release 10)", 3GPP Standard; 3GPP TS 36.314, 3rd Generation Partnership Project (3GPP), Mobile Competence Centre ; 650, Route Des Lucioles ; F-06921 Sophia-Antipolis Cedex ; France, No. V10.0.0, Dec. 17, 2010 (Dec. 17, 2010) , pp. 1-17, XP050462123, [retrieved on Dec. 17, 2010].

"3rd Generation Partnership Project; Technical Specification Group Radio Access Network; Evolved Universal Terrestrial Radio Access (E-UTRA) ; Physical layer; Measurements (Release 10)", 3GPP Standard; 3GPP TS 36.214, 3rd Generation Partnership Project (3GPP), Mobile Competence Centre ; 650, Route Des Lucioles ; F-06921 Sophia-Antipolis Cedex ; France, No. V10.0.0, Dec. 22, 2010 (Dec. 22, 2010) , pp. 1-13, XP050462368, [ retrieved on Dec. 22, 2010].

"3rd Generation Partnership Project; Technical Specification Group Radio Access Network; Evolved Universal Terrestrial Radio Access Network (E-UTRAN) ; X2 application protocol (X2AP) (Release 10)", 3GPP Standard; 3GPP TS 36.423, 3rd Generation Partnership Project (3GPP), Mobile Competence Centre ; 650, Route Des Lucioles ; F-06921 Sophia-Antipolis Cedex ; France, No. V10.0.0, Dec. 21, 2010 (Dec. 21, 2010) , pp. 1-123, XP050462198, [retrieved on Dec. 21, 2010].

International Search Report and Written Opinion—PCT/US2012/025056—ISA/EPO—May 31, 2012.

Qualcomm Incorporated: "Enabling reporting of ABS resource status for eICIC purposes", 3GPP Draft; R3-110735, 3rd Generation Partnership Project (3GPP), Mobile Competence Centre ; 650, Route Des Lucioles ; F-06921 Sophia-Antipolis Cedex ; France, vol. RAN WG3, No. Taipei, Taiwan; Feb. 21, 2011, Feb. 15, 2011 (Feb. 15, 2011), XP050497652, [retrieved on Feb. 15, 2011].

Qualcomm Incorporated: "Enabling reporting of ABS resource status for eICIC purposes", 3GPP Draft; R3-110164, 3rd Generation Partnership Project (3GPP), Mobile Competence Centre ; 650, Route Des Lucioles ; F-06921 Sophia-Antipolis Cedex ; France, vol. RAN WG3, No. Dublin, Ireland; Jan. 17, 2011, Jan. 11, 2011 (Jan. 11, 2011), XP050497161, [retrieved on Jan. 11, 2011].

Qualcomm Incorporated: "More on resource status report for eICIC", 3GPP Draft; R3-110163, 3rd Generation Partnership Project (3GPP), Mobile Competence Centre ; 650, Route Des C. Documents Considered to Be Relevant Lucioles ; F-06921-Sophia-Anti Polis Cedex : France. vol. RAN-WG3, No. Dublin, Ireland; Jan. 17, 2011, Jan. 11, 2011 (Jan. 11, 2011), XP050497160, [retrieved on Jan. 11, 2011].

Qualcomm Incorporated: "Way forward for eICIC on reporting the number of active UEs requiring protetion", 3GPP Draft; R3-110733, 3rd Generation Partnership Project (3GPP) , Mobile Competence Centre ; 650, Route Des Lucioles ; F-06921 Sophia-Antipolis Cedex ; France, vol. RAN WG3, No. Taipei, Taiwan; Feb. 21, 2011, Feb. 15, 2011 (Feb. 15, 2011), XP050497650, [ retrieved on Feb. 15, 2011].

\* cited by examiner

Table 1 SRPI of Macro eNB

| Index | 0 | 1 | 2 | 3 | 4 | 5 | 6 | 7 |
|---|---|---|---|---|---|---|---|---|
| SRPI value | X | X | X | U | X | X | X | N |

Table 2 SRPI of Femto eNB

| Index | 0 | 1 | 2 | 3 | 4 | 5 | 6 | 7 |
|---|---|---|---|---|---|---|---|---|
| SRPI value | X | X | X | N | X | X | X | U |

METHODS AND APPARATUS FOR EVALUATING NUMBER OF PROTECTED ACTIVE USERS BASED ON QOS REQUIREMENTS, THROUGHPUT AND TRAFFIC

CLAIM OF PRIORITY UNDER 35 U.S.C. §119

The present application for patent claims priority to U.S. Provisional Application No. 61/442,670, entitled, "Method for Evaluating Number of Protected Active Users Based on QoS Requirements, Throughput and Traffic," filed Feb. 14, 2011, and assigned to the assignee hereof and hereby expressly incorporated by reference herein.

TECHNICAL FIELD

The present disclosure relates generally to communication and, more specifically, to techniques for determining and reporting number of active users requiring protection in a wireless communication network.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

In an aspect of the disclosure, a method for wireless communications is provided. The method generally includes determining a number of one or more active user equipments (UEs) in a first cell that might benefit from reduced interference if a base station of a second cell protected a first set of resources by controlling transmissions thereon, and reporting the determined number of active UEs to the base station of the second cell.

In an aspect of the disclosure, a method for wireless communications is provided. The method generally includes receiving, by a base station of a second cell, an indication of a number of one or more active user equipments (UEs) in a first cell that might benefit from reduced interference if the base station of the second cell protected a first set of resources by controlling transmissions thereon, and determining one or more resources to protect based on the received indication.

In an aspect of the disclosure, an apparatus for wireless communications is provided. The apparatus generally includes means for determining a number of one or more active user equipments (UEs) in a first cell that might benefit from reduced interference if a base station of a second cell protected a first set of resources by controlling transmissions thereon, and means for reporting the determined number of active UEs to the base station of the second cell.

In an aspect of the disclosure, an apparatus for wireless communications is provided. The apparatus generally includes means for receiving, by an apparatus in a second cell, an indication of a number of one or more active user equipments (UEs) in a first cell that might benefit from reduced interference if the apparatus protected a first set of resources by controlling transmissions thereon, and means for determining one or more resources to protect based on the received indication.

In an aspect of the disclosure, a computer-program product for wireless communications is provided. The computer-program product comprising a computer-readable medium having instructions stored thereon, the instructions being executable by one or more processors. The instructions generally include instructions for determining a number of one or more active user equipments (UEs) in a first cell that might benefit from reduced interference if a base station of a second cell protected a first set of resources by controlling transmissions thereon, and instructions for reporting the determined number of active UEs to the base station of the second cell.

In an aspect of the disclosure, a computer-program product for wireless communications is provided. The computer-program product comprising a computer-readable medium having instructions stored thereon, the instructions being executable by one or more processors. The instructions generally include instructions for receiving, by a base station of a second cell, an indication of a number of one or more active user equipments (UEs) in a first cell that might benefit from reduced interference if the base station of the second cell protected a first set of resources by controlling transmissions thereon, and instructions for determining one or more resources to protect based on the received indication.

In an aspect of the disclosure, an apparatus for wireless communications is provided. The apparatus generally includes at least one processor and a memory coupled to the at least one processor. The at least one processor configured to determine a number of one or more active user equipments (UEs) in a first cell that might benefit from reduced interference if a base station of a second cell protected a first set of resources by controlling transmissions thereon, and report the determined number of active UEs to the base station of the second cell.

In an aspect of the disclosure, an apparatus for wireless communications is provided. The apparatus generally includes at least one processor and a memory coupled to the at least one processor. The at least one processor configured to receive, by the apparatus in a second cell, an indication of a number of one or more active user equipments (UEs) in a first cell that might benefit from reduced interference if the base station of the second cell protected a first set of resources by controlling transmissions thereon, and determine one or more resources to protect based on the received indication.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA 2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
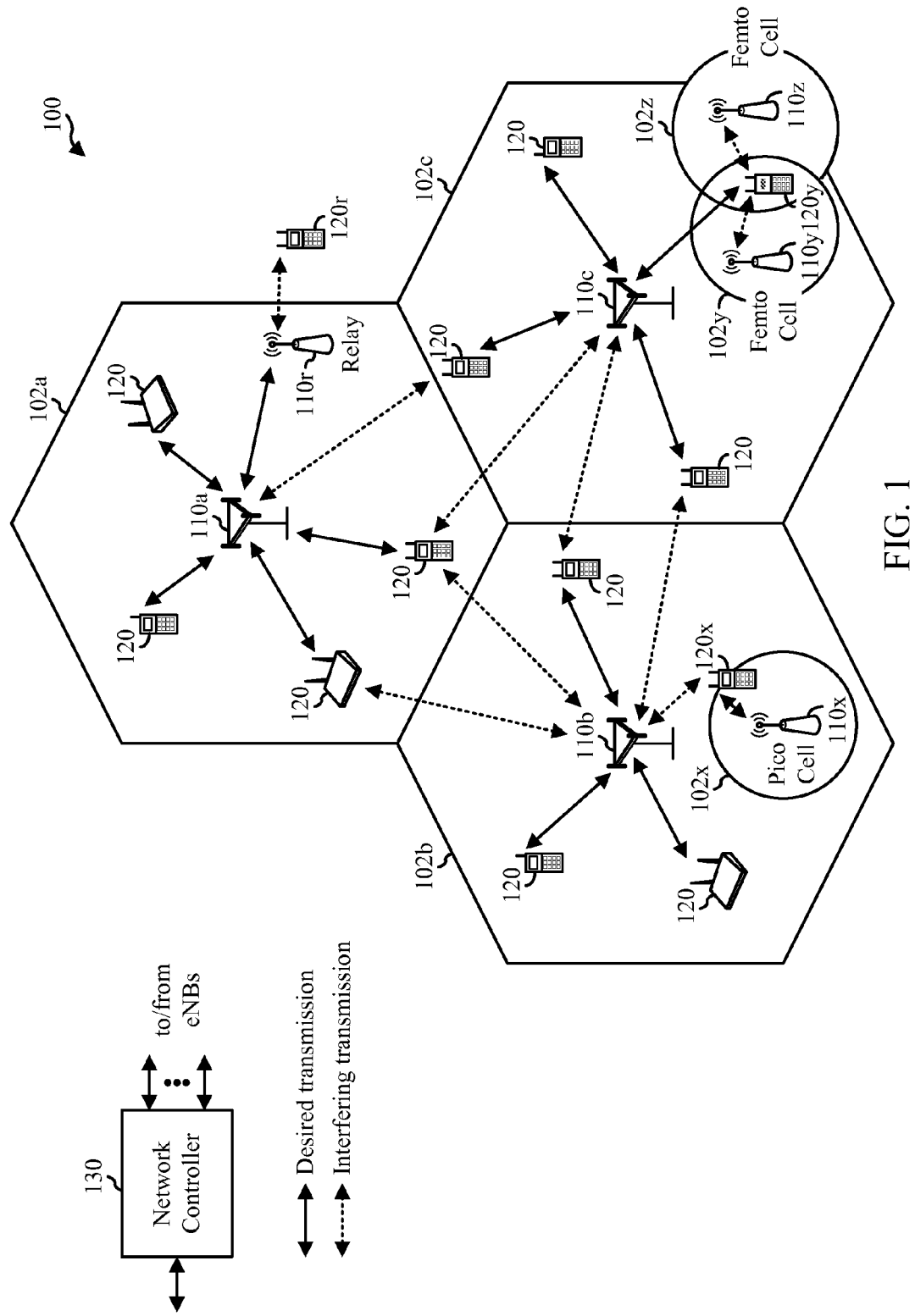
FIG. 1 is a block diagram conceptually illustrating an example of a wireless communications network in accordance with certain aspects of the present disclosure.

FIG. 1 shows a wireless communication network 100, which may be an LTE network. Wireless network 100 may include a number of evolved Node Bs (eNBs) 110 and other network entities. An eNB may be a station that communicates with the UEs, and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNBs 110a, 110b and 110c may be macro eNBs for macro cells 102a, 102b and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

Wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

Wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in wireless network 100. For example, macro eNBs may have a high transmit power level (e.g., 20 Watts) whereas pico eNBs, femto eNBs and relays may have a lower transmit power level (e.g., 1 Watt).

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. Network controller 130 may communicate with eNBs 110 via a backhaul. eNBs 110 may also communicate with one another, e.g., directly or indirectly via wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
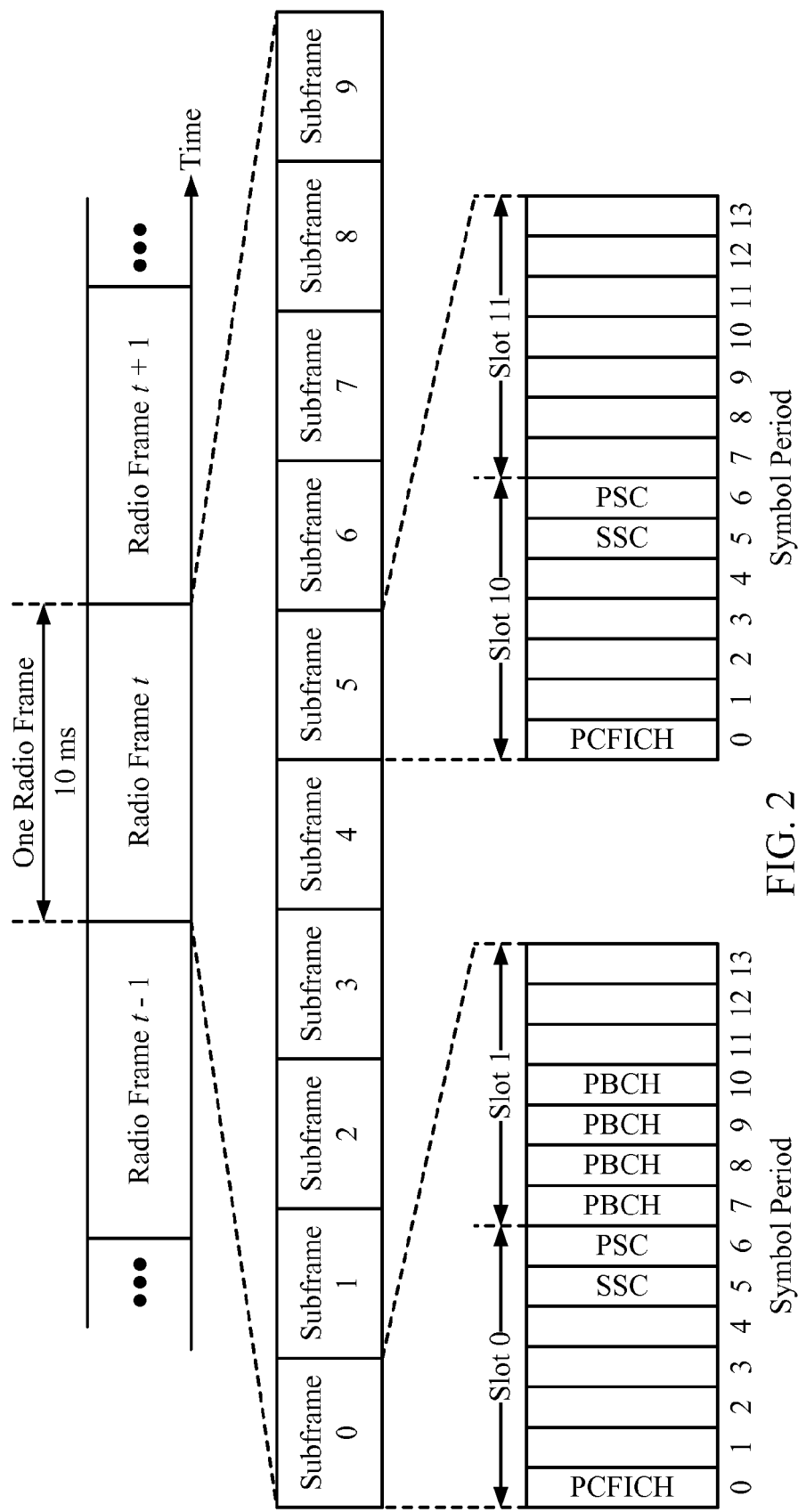
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2 L symbol periods in each subframe may be assigned indices of 0 through 2 L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 3:
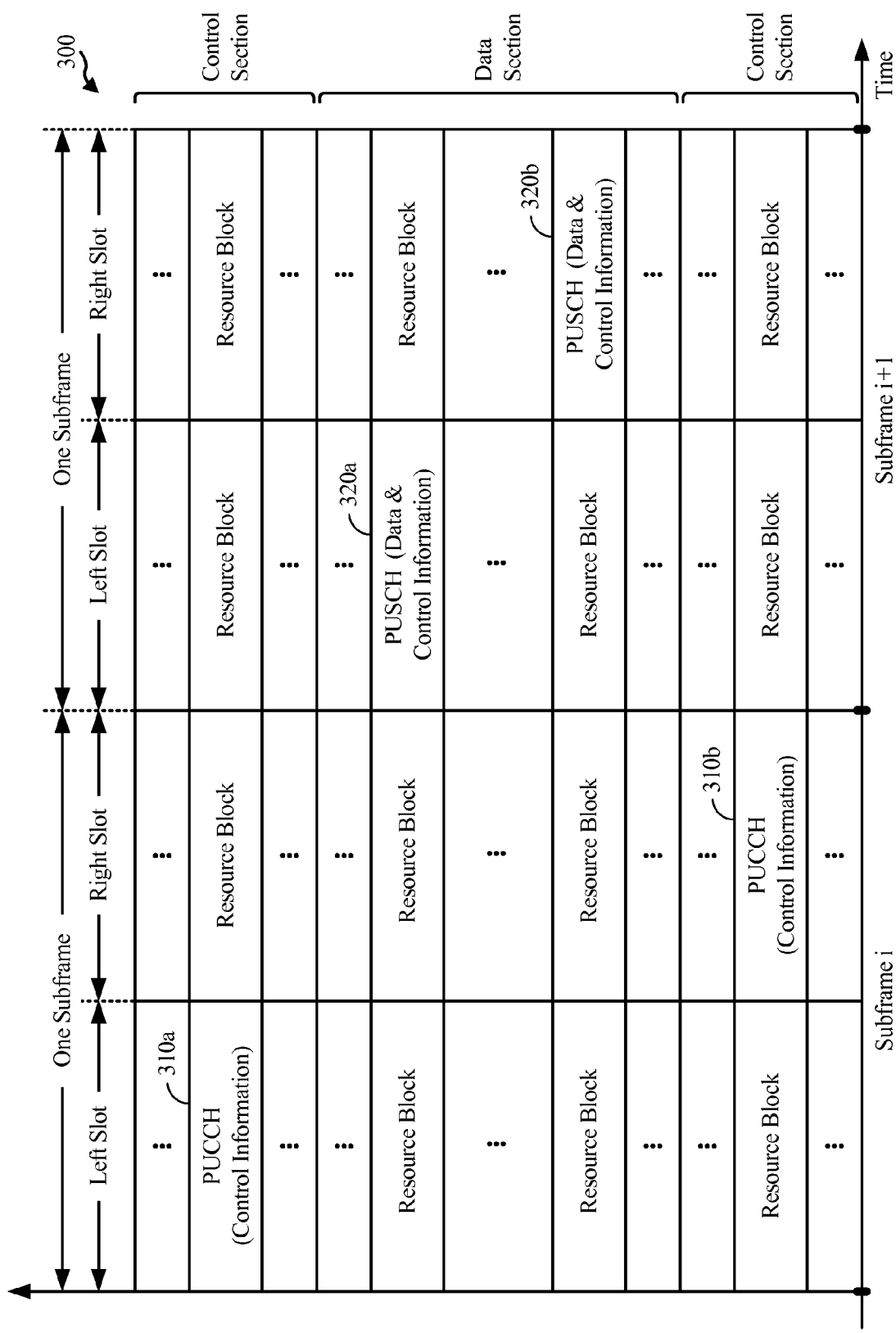
FIG. 3 illustrates an example format for the uplink in Long Term Evolution (LTE) in accordance with certain aspects of the present disclosure.

FIG. 3 shows an exemplary format 300 for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the Node B. The UE may transmit control information in a Physical Uplink Control Channel (PUCCH) 310a, 310b on the assigned resource blocks in the control section. The UE may transmit only data or both data and control information in a Physical Uplink Shared Channel (PUSCH) 320a, 320b on the assigned resource blocks in the data section. An uplink transmission may span both slots of a subframe and may hop across frequency as shown in FIG. 3.

The PSS, SSS, CRS, PBCH, PUCCH and PUSCH in LTE are described in 3GPP TS 36.211, entitled, "Evolved Universal Terrestrial Radio Access (E-UTRA); Physical Channels and Modulation," which is publicly available.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high-received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of the eNB at a UE (and not based on the transmit power level of the eNB).

Figure 4:
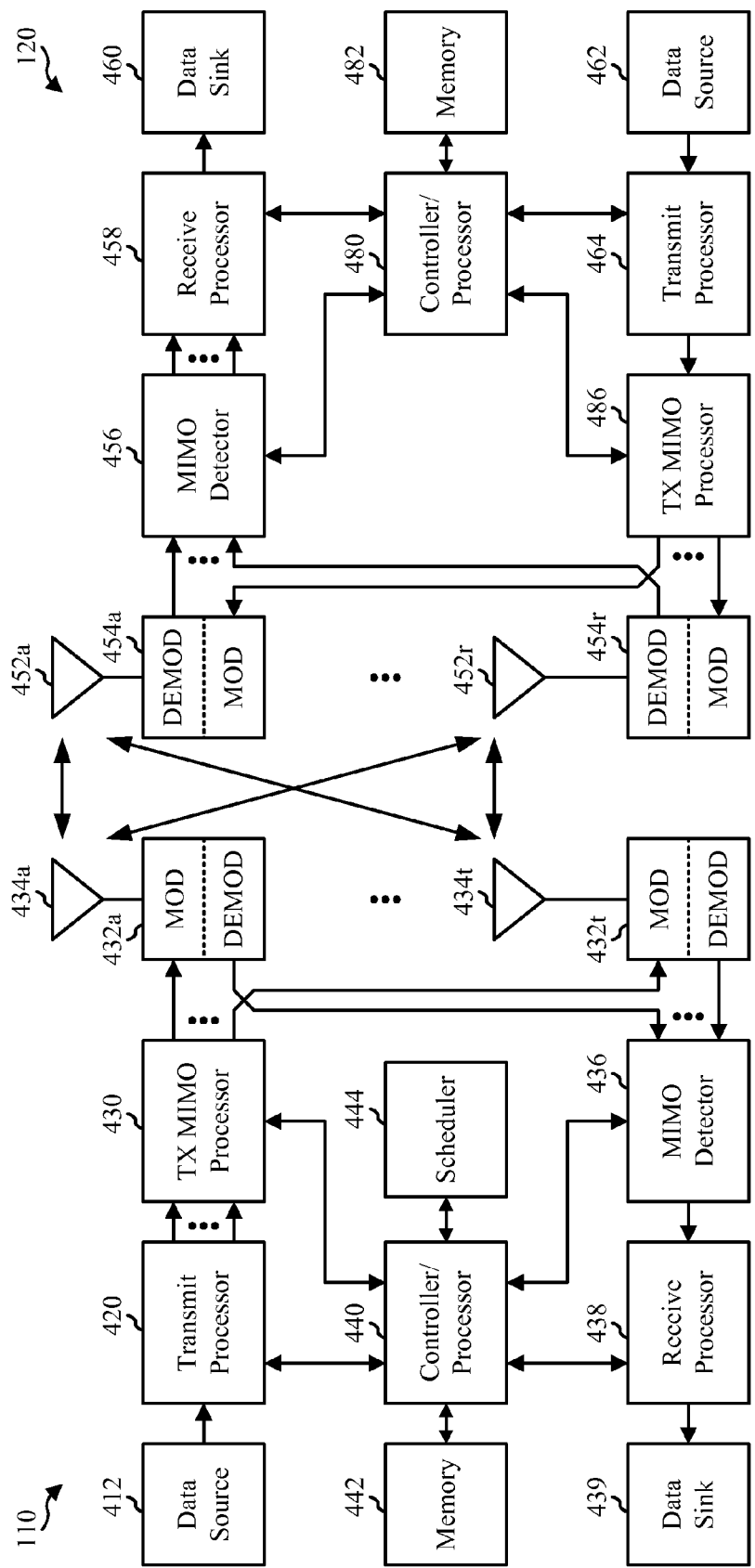
FIG. 4 illustrates a block diagram conceptually illustrating an example of a base station in communication with a user equipment device (UE) in a wireless communications network, in accordance with certain aspects of the present disclosure.

FIG. 4 shows a block diagram of a design of a base station/eNB 110 and a UE 120, which may be one of the base stations/eNBs and one of the UEs in FIG. 1. For a restricted association scenario, base station 110 may be macro eNB 110c in FIG. 1, and UE 120 may be UE 120y. Base station 110 may also be a base station of some other type. Base station 110 may be equipped with T antennas 434a through 434t, and UE 120 may be equipped with R antennas 452a through 452r, where in general T≥1 and R≥1.

At base station 110, a transmit processor 420 may receive data from a data source 412 and control information from a controller/processor 440. The control information may be for the PBCH, PCFICH, PHICH, PDCCH, etc. The data may be for the PDSCH, etc. Processor 420 may process (e.g., encode and symbol map) the data and control information to obtain data symbols and control symbols, respectively. Processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide T output symbol streams to T modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. T downlink signals from modulators 432a through 432t may be transmitted via T antennas 434a through 434t, respectively.

At UE 120, antennas 452a through 452r may receive the downlink signals from base station 110 and may provide received signals to demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all R demodulators 454a through 454r, perform MIMO detection on the received symbols, if applicable, and provide detected symbols. A receive processor 458 may process (e.g., demodulate, deinterleave, and decode) the detected symbols, provide decoded data for UE 120 to a data sink 460, and provide decoded control information to a controller/processor 480.

On the uplink, at UE 120, a transmit processor 464 may receive and process data (e.g., for the PUSCH) from a data source 462 and control information (e.g., for the PUCCH) from controller/processor 480. Processor 464 may also generate reference symbols for a reference signal. The symbols from transmit processor 464 may be precoded by a TX MIMO processor 466 if applicable, further processed by modulators 454a through 454r (e.g., for SC-FDM, etc.), and transmitted to base station 110. At base station 110, the uplink signals from UE 120 may be received by antennas 434, processed by demodulators 432, detected by a MIMO detector 436 if applicable, and further processed by a receive processor 438 to obtain decoded data and control information sent by UE 120. Processor 438 may provide the decoded data to a data sink 439 and the decoded control information to controller/processor 440.

Controllers/processors 440 and 480 may direct the operation at base station 110 and UE 120, respectively. Controller/processor 440, receive processor 438, and/or other processors and modules at base station 110 may perform or direct process 800 in FIG. 8 and/or other processes for the techniques described herein. Memories 442 and 482 may store data and program codes for base station 110 and UE 120, respectively. A scheduler 444 may schedule UEs for data transmission on the downlink and/or uplink.

An Example Resource Partitioning

According to certain aspects of the present disclosure, when a network supports enhanced interference coordination, the base stations may negotiate with each other to coordinate resources in order to reduce or eliminate interference by the interfering cell's giving up part of its resources. In accordance with this interference coordination, a UE may be able to access a serving cell even with severe interference by using resources yielded by the interfering cell.

For example, a femto cell with a closed access mode (i.e., in which only a member femto UEs can access the cell) in the coverage area of an open macro cell may be able to create a "coverage hole" for a macro cell by yielding resources and effectively removing interference. By negotiating for a femto cell to yield resources, the macro UE under the femto cell coverage area may still be able to access its serving macro cell using these yielded resources. Similarly, the macro cell may yield some of its resources to be used by the femto UEs.

In a radio access system using OFDM, such as E-UTRAN, the yielded resources may be time based, frequency based, or a combination of both. When the coordinated resource partitioning is time based, the interfering cell may simply not use some of the subframes in the time domain. When the coordinated resource partitioning is frequency based, the interfering cell may yield subcarriers in the frequency domain. With a combination of both frequency and time, the interfering cell may yield frequency and time resources.

Figure 5:
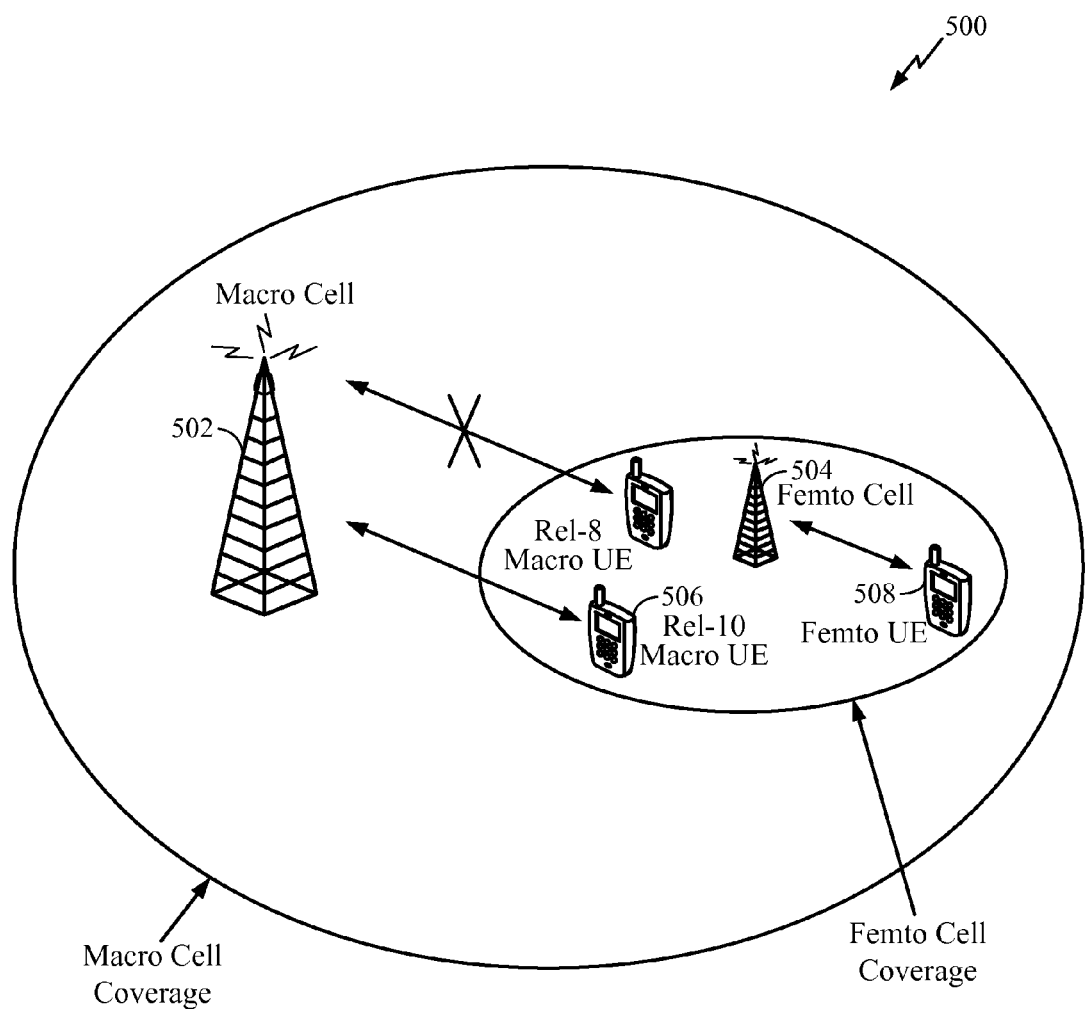
FIG. 5 illustrates an example heterogeneous network in accordance with certain aspects of the present disclosure.

FIG. 5 shows an example scenario 500 where enhanced inter-cell interference coordination (eICIC) can allow a macro UE 506 supporting eICIC (Rel-10 Macro UE in the figure) to access the macro cell 502 even when it is under severe interference from the femto cell 504. The femto cell 504 may yield some resources to the macro UE 506 such that the macro UE under the femto cell coverage area may still be able to access its serving macro cell 502 using these yielded resources. Similarly, the macro cell 502 may yield some resources to the femto cell 504 such that the femto UEs 508 can communicate with the femto base station 504 even under severe interference from the macro cell 502.

According to certain aspects, networks may support enhanced interference coordination, where there may be different sets of partitioning information. A first of these may be referred to as Semi-static Resource Partitioning information (SRPI). A second of these sets may be referred to as Adaptive Resource Partitioning information (ARPI). As the name implies, SRPI typically does not change frequently, and it may be sent to the UE so that the UE can use the resource partitioning information for its own operations.

As an example, the resource partitioning may be implemented with 8 ms periodicity (8 subframes) or 40 ms periodicity (40 subframes). According to certain aspects, it may be assumed that frequency division duplexing (FDD) may also be applied such that frequency resources may also be partitioned. For the downlink (e.g., from a cell node B to a UE), a partitioning pattern may be mapped to a known subframe (e.g., a first subframe of each radio frame that has system frame number (SFN) value that is a multiple of an integer N). Such a mapping may be applied in order to determine resource-partitioning information for a specific subframe. As an example, a subframe that is subject to coordinated resource partitioning (e.g., yielded by an interfering cell) for the downlink may be identified by an index:

IndexSRPI_DL=(SFN*10+subframe number)mod 8

For the uplink, the SRPI mapping may be shifted, for example, by 4 ms. Thus, an example for the uplink may be:

IndexSRPI_UL=(SFN*10+subframe number+4)mod 8

SRPI may use the following three values for each entry:
U (Use): This value indicates the subframe has been cleaned up from the dominant interference to be used by this cell (e.g., the main interfering cells do not use this subframe).
N (No Use): This value indicates the subframe shall not be used.
X (Unknown): This value indicates the subframe is not statically partitioned. Details of resource usage negotiation between base stations are not known to the UE.
Another possible set of parameters for SRPI can be the following:

U (Use): This value indicates the subframe has been cleaned up from the dominant interference to be used by this cell. (e.g., the main interfering cells do not use this subframe).
N (No Use): This value indicates the subframe shall not be used.
X (Unknown): This value indicates the subframe is not statically partitioned. Details of resource usage negotiation between base stations are not known to the UE.
C (Common): This value may indicate all cells may use this subframe without resource partitioning. This subframe may be subject to interference, so that the base station may choose to use it only for the UE that is not under big interference.

The serving cell's SRPI may be broadcasted over the air. In E-UTRAN, the SRPI of the serving cell may be sent in a master information block (MIB), or one of the system information blocks (SIBs). A predefined SRPI may be defined based on the characteristics of cells, e.g. macro cell, pico cell (e.g., with open access) and femto cell (e.g., with closed access). In such a case, encoding of SRPI in the system overhead message may result in more efficient broadcast over the air.

The base station may also broadcast the neighbor cell's SRPI in one of the SIBs. For this, SRPI may be sent with its corresponding range of physical cell IDs.

ARPI may represent further resource partitioning information with the detailed information for the 'X' subframes in SRPI. As noted above, detailed information for the 'X' subframes is typically only known to the base stations and UE does not know it.

Figure 6:
FIG. 6 illustrates an example resource partitioning in a heterogeneous network in accordance with certain aspects of the present disclosure.

FIG. 6 illustrates example resource partitioning in a heterogeneous network in accordance with certain aspects of the present disclosure. As illustrated, if a macro cell has a U subframe (e.g., the subframe is cleaned up from the dominant interference), the femto cell has a corresponding N subframe (e.g., may transmit an almost blank subframe). Similarly, if the femto cell has a U subframe (e.g., subframe index=7), the macro cell has a corresponding N subframe.

Figure 7:
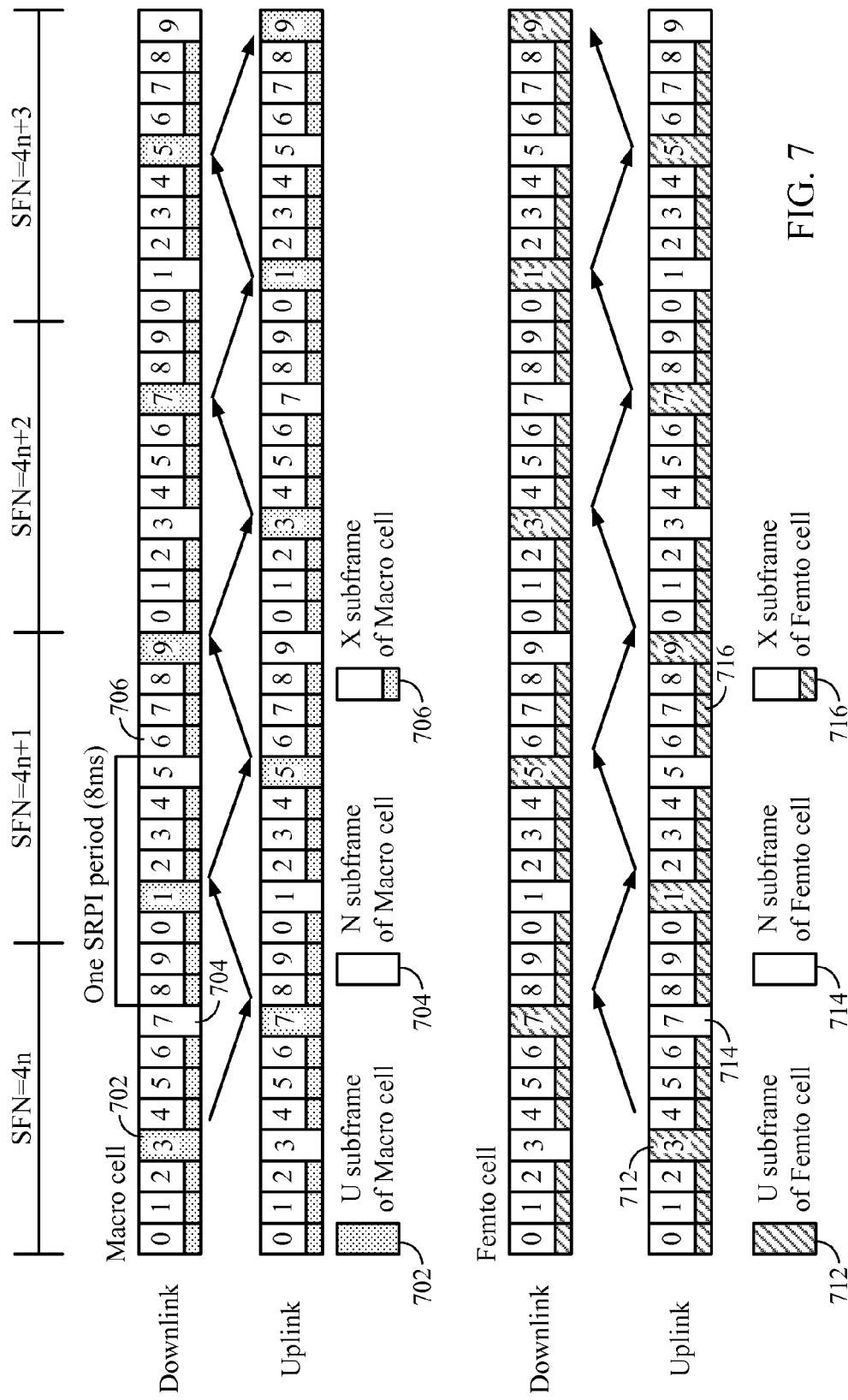
FIG. 7 illustrates example cooperative partitioning of subframes in a heterogeneous network, in accordance with certain aspects of the present disclosure.

FIG. 7 illustrates example cooperative partitioning of subframes in a heterogeneous network in accordance with certain aspects of the present disclosure. As illustrated, SRPI may be assigned to macro and femto cells such that some resources are protected for the macro cell usage and some resources are protected for femto cell usage. In this figure, a U 702, N 704 or X 706 subframe is a subframe corresponding to a U, N or X SRPI assignment of the macro cell. Similarly, a U 712, N 714 or X 716 is a subframe corresponding to a U, N or X SRPI assignment of the femto cell.

Reporting Number of Active UEs Requiring Protection

Certain aspects of the present disclosure propose a method to transmit information about number of active users that need protection in a cell (e.g., a pico cell). The information may be transmitted to an interfering cell (e.g., a macro cell) using a resource status update message. The active users may be defined as users (e.g., UEs) whose downlink performance and/or quality of service are limited by available protected resources.

As described earlier, to reduce interference in overlapping cells (e.g., a macro cell and a pico cell), the interfering cell (e.g., the macro cell) may protect some resources (e.g., by transmitting almost blank subframes (ABS)) to be used by the victim cell (e.g., the pico cell). For certain aspects, the victim cell may notify the interfering cell of the percentage of the protected resources that are used. As an example, the usage notification may be transmitted in a downlink (DL) ABS status IE (information element) as part of a resource status update message exchanged over X2 communications link. The interfering cell may utilize the information and decide whether or not to increase, decrease or keep the same number of protected resources.

For ease of explanation, examples presented in the rest of this document will primarily focus on a macro cell as an interfering cell and a pico cell as a victim cell. The macro cell may protect resources to be used by the pico cell. However, in general, any of the overlapping cells (e.g., pico cell, macro cell, femto cell, and the like) may protect resources to be used by other cells without departing from the scope of the present disclosure.

When time-domain inter-cell interference coordination (ICIC) is used between a macro cell and a pico cell, the pico cell may report a status update (e.g., DL ABS Status IE) to the macro cell. The macro cell may determine whether or not the pico cell needs additional protected resources based on the received status update. For example, if the protected resources are highly overloaded, the macro cell may assign more protected resources to the pico cell. Alternatively, if protected resources that are assigned to the pico cell are lightly loaded, the macro cell depending on its own load or other considerations may decrease the number of ABSs. The decrease in the available ABSs may correspondingly decrease the number of protected resources available to the pico users (e.g., UEs communicating with the pico cell) that may be strongly interfered by the macro cell.

As another example, if protected resources assigned to a pico cell are heavily loaded, while the macro cell is lightly loaded, the macro cell may increase the number of ABSs so as to provide more protected resources for the pico cell. However, if both the macro cell and the protected resources that are assigned to the pico cell are heavily loaded, it may not be clear whether the macro cell should increase, decrease, or retain the current number of ABSs. Therefore, as described in more detail below, additional information other than resource utilization may be taken into account while trying to achieve network-wide fairness or optimality.

For certain aspects, in order to ensure inter-node fairness between users that are served by the macro cell and users that are served by the pico cell that are taking advantage of the ABSs provided by the macro cell, the pico cell may include some additional feedback information in the resource status update message. For example, a network including a macro cell and a pico cell may be considered (e.g., FIG. 1). The macro cell 110b may be heavily loaded, for example, serving many UEs with full-buffer traffic. In addition, the pico cell 110x may be located in the coverage area of the macro cell with a single full-buffer UE being strongly interfered by the macro cell. In this case, although the macro cell gets informed—through the resource status update messages—that the protected resources of the pico cell are heavily loaded, the macro cell has no knowledge that only one of the pico UEs (e.g., UEs communicating with the pico cell) utilizes the protected resources. In such a case, without any additional information, most likely the macro cell may decide not to reduce the number of ABSs that is providing for the pico cell. In this example, it is clear that the approach is not completely fair, since the pico UE may benefit from much higher number of resources compared to the macro UEs. The reason is that the number of active UEs (e.g., active UEs served by the pico cell) is not taken into account by the macro cell when deciding the amount of resources to protect.

In general, when a macro cell is overloaded, the macro cell may utilize one of the following approaches if the pico cell reports a high load on the protected resources. The macro cell may set a fixed proportion of its subframes to be ABS. As an example, the fixed amount may be defined based on operations, administration and management (OA&M) procedures. Alternatively, the macro cell may keep the latest number of ABSs that was provided to the pico cell when the pico cell reported lower resource utilization. Namely, if both the macro cell and the pico protected resources are overloaded, number of ABSs may not change. As another alternative, the macro cell may consider some additional "local" information, such as number of active users served by the macro cell to determine whether to change the current number of ABSs. However, these approaches may ignore the inter-cell fairness and therefore may incur severe performance penalty in many realistic scenarios.

For certain aspects, the pico cell may report the number of active UEs (exemplary definitions of the active UEs are given below) which need to be protected. The macro cell may use this information along with any other similar local information at the macro cell to determine a preferred (e.g., from an inter-cell fairness perspective) number of ABSs to be assigned to the pico cell.

For certain aspects, number of active users needing protection may be reported by the pico cell to the macro cell (e.g., along with the DL ABS Status report). The macro cell may use the number of active users in the pico cell to enforce inter-cell fairness. For instance, in the above example in which both macro and pico protected resources were overloaded, the macro cell may compare number of active UEs in the pico cell that are using the protected resources with the overall number of active UEs in the macro cell. The Macro cell may then decide how many resources to protect (e.g., assign to the pico cell) based on the comparison results.

For certain aspect, the macro cell may on average assign equal number of resources to each UE (e.g., for both the UEs served by the macro cell and the UEs served by the pico cell). Alternatively, any other approach to achieve fairness may be pursued. Availability of information (at the macro cell) regarding number of active users in the pico cell requiring protection may offer significant benefits over any other scheme where this information is not provided.

Option A for Reporting Number of Active Users

Number of active UEs in the downlink per Quality of service Class Identifier (QCI) is described in Layer 2 measurements specifications in the LTE standard (3GPP TS 36.314 which is publicly available) as follows.

$$M(T, qci, p) = \left\lfloor \frac{\sum_{\forall i} N(i, qci)}{I(T, p)} \right\rfloor \quad (1)$$

where M (T, qci, p) where represents number of active UEs in the DL per QCI, averaged during time period T. N(i,qci) represents number of UEs for which there is buffered data for the DL in medium access control (MAC), radio link control (RLC) or packet data convergence protocol (PDCP) layers for a data radio bearer (RDB) of traffic class with QCI=qci at sampling occasion i. In RLC and PDCP layers, buffered data may correspond to data available for transmission. In addition, buffered data includes data for which HARQ transmission has not yet terminated. i may represent sampling occasion during time period T. A sampling occasion may occur once every p seconds. p represents length of sampling period in seconds. I(T, P) may represent total number of sampling occasions during time period T. The number of active UEs as defined in equation (1) refers to UEs per QCI for which there is buffered data for DL for DRBs.

Certain aspects may define number of active UEs to be reported by the pico cell in the resource status update message similar to the definition of the number of active UEs as described in equation (1). However, such an approach may not satisfactorily address the inter-cell fairness. In fact, for certain aspects, only users that are strongly interfered by one or more macro cells and are preferred to be scheduled on protected resources may be accounted for when inter-cell fairness is enforced. Clearly, if a UE is not strongly interfered by any of the macro cells, there may be no (or very limited) benefit in scheduling such a UE on the protected resources. Even if the scheduler in the pico cell decides to assign this UE on the protected resources, such a UE should not be counted when reporting the number of active UEs in the resource status update message.

Based on the above considerations, for certain aspects, the pico cell may count and report number of active UEs that are 'strongly interfered' by the macro cell. This information may be defined by re-using as much as possible of the definition in equation (1). In particular, N(i, qci) in equation (1) should only count the UEs that are 'strongly interfered' by the macro cell (e.g., the UEs that need to be scheduled on the protected resources). It should be noted that the definition of 'strongly interfered UEs' may be in line with the same definition as used in DL ABS Status IE (e.g., UEs whose interference is more than a certain threshold).

Option B for Reporting Number of Active Users

The definition of active UEs as indicated in the option A may not consider large traffic imbalances among UEs, which would be important to take into account for inter-cell fairness. As an example, a pico cell may have two UEs strongly interfered by a macro cell and a few UEs that do not require special protection (e.g., no interference). One of the UEs that receives strong interference may have full buffer DL traffic, and the other UE may have a very low rate, low duty cycle traffic. All of the protected resources may be utilized by the UEs and one hundred percent resource utilization may be reported. However, most of the resources may be utilized by one of the UEs (e.g., the full-buffer UE that requires protection). Although in this example, two active UEs need protection, in practice the performance of one of the UEs (e.g., the full-buffer UE) is limited by the amount of ABSs provided by the macro cell. Therefore, only the full-buffer UE may benefit from having more resources. Hence, to ensure a better inter-cell fairness, in this example, the pico cell may only report one active UE in the protected resources. As a result, for certain aspects, a pico cell may count and report the active UEs (that are strongly interfered by the macro cell) whose downlink traffic are higher than a threshold.

In another example, several delay-sensitive UEs may be considered that are attached to a pico cell (110x in FIG. 1, only one pico UE is shown in the figure) that are strongly interfered by a macro cell 110b. All of these UEs may have strict quality of service (QoS) requirements, for example, in terms of maximum delay. Only some of the UEs may achieve the required QoS, and some may not achieve the required QoS. For certain aspects, only the UEs that are not achieving the required QoS may be counted by the pico cell for reporting in the resource status update message. In fact, strongly interfered UEs that are already achieving their required QoS with the current amount of protected resources may not benefit from an increase in the protected resources (unless their required QoS changes, or the total offered load from strongly interfered UEs increases).

Based on the above considerations, for certain aspects, a UE may be counted as an "active protected UE" if the UE needs protected resources because of strong interference from at least an aggressor (e.g., interferer), and if DL performance and/or QoS of the UE is limited by the current number of protected resources. According to this general definition, the pico cells may evaluate which UEs are limited by strong interference and the amount of current protected resources, to determine the number of active UEs accordingly.

For certain aspects, one or more rules to determine the number of active UEs may be defined based on either one or a combination of the following parameters: DL radio link control (RLC) buffer status, DL hybrid automatic repeat request (HARD) processes status, DL packet delays, scheduled DL throughput, physical resource block (PRB) assignments, and QoS requirements. These rules may be used consistently across all the cells to determine the number of active UEs that may be exchanged over the X2 interface. The above parameters may be measured once, or multiple times (e.g., with averaging several measurements). For example, multiple samples may be taken over a measurement window, and some rules may be defined to decide whether to count a UE based on the multiple sampled results.

An important detail to be discussed is the significance of the number of active UEs as defined above, when the protected resources are not fully loaded. Even when the load on the protected resources is light, this doesn't necessarily entail that all UEs achieve their required QoS. For example, if a UE has a highly bursty traffic but with very strict delay constraints, although the offered traffic may be low enough to be scheduled on the available protected resources (perhaps leaving most of the available protected resources unused in a measurement window), still the delay requirement may not be achieved because of the sparsity of the protected resources, which may entail an increased packet delay. For certain aspects, the interfering node (e.g., the macro cell) may decide to increase the number of protected resources notwithstanding the corresponding DL ABS Status report that may indicate a low usage of the protected resources.

As discussed above, information about the number of active UEs may be exchanged among cells in a cellular network. As an example, the exchange may be carried out over the X2 interface. For some aspects, only the UEs that need protection may be counted. The "Victim" cell (e.g., the pico cell) may inform each "aggressor" cell (e.g., macro cell) about the number of active UEs strongly interfered by that destination cell. For certain aspects, protection may be defined as a difference (e.g., in reference signal received power (RSRP)) between serving cell and interfering cell, for each UE.

For certain aspects, number of UEs may be counted per-QCI (Quality of service class identifier). Therefore, one value may be reported for each QCI. For certain aspects, active UEs may correspond to the UEs that have data in their DL radio link control (RLC) buffers and/or with pending DL HARQ processes. For certain aspects, DL performance of active UEs (that may, for example, be specified by throughput or delay) may be limited by the number of protected resources. Therefore, the QoS constraints of the active users may not be achieved if number of protected resources are small. An increase in the protected resources provided by the interfering cell may entail an improvement in the performance of that UE, or may help the UE to achieve its QoS constraint (e.g., by reducing the packet delay experienced by the UE).

For certain aspects, the measurements taken for determining the number of active UEs may be averaged. Alternatively, the sampling may be performed just before the X2 message is formed, without any averaging. If averaging is done, multiple samples may be taken over the measurement window. In this case, for each sampling point the cell may determine whether a UE should be counted or not (e.g., based on RLC buffers, HARQ processes, QoS requirements, and the like). At the end of the measurement window, the UE may be counted if for example: (i) it has been counted in at least one sample, or (ii) it has been counted in at least half of the samples, or any other criteria.

For certain aspects, physical resource block (PRB) usage may be considered to determine number of active UEs. For example, during the measurement window, a cell may evaluate PRB usage of each UE that needs protection. Number of active UEs may be determined by comparing the PRB usages of the UEs with pre-determined thresholds. For example, the cell may count only those UEs whose PRB usage is above the pre-determined threshold. For certain aspects, the threshold may depend on the total number of connected-mode UEs, total number of UEs with non-zero PRB allocation, the largest PRB usage among all considered UEs, the QoS requirements/type of traffic of each UE, and the like. It should be noted that the QoS requirements/type of traffic of each UE may result in different thresholds for different UEs.

For certain aspects, an interfering cell (e.g., the macro cell) which receives information about the number of active UEs needing protection from a victim cell (e.g., the pico cell) may use the information about the number of active UEs to determine the number of resources to protect. Number of UEs claimed by the victim cell may be compared with a similar number determined by the interfering cell. For certain aspects, goal of the macro cell may be to equalize average resources per user. The macro cell may also consider DL ABS Status message. For instance, the above comparison may be carried out only if DL ABS Status message indicates an overloading of the protected resources, or only if the interfering cell is overloaded.

Figure 8:
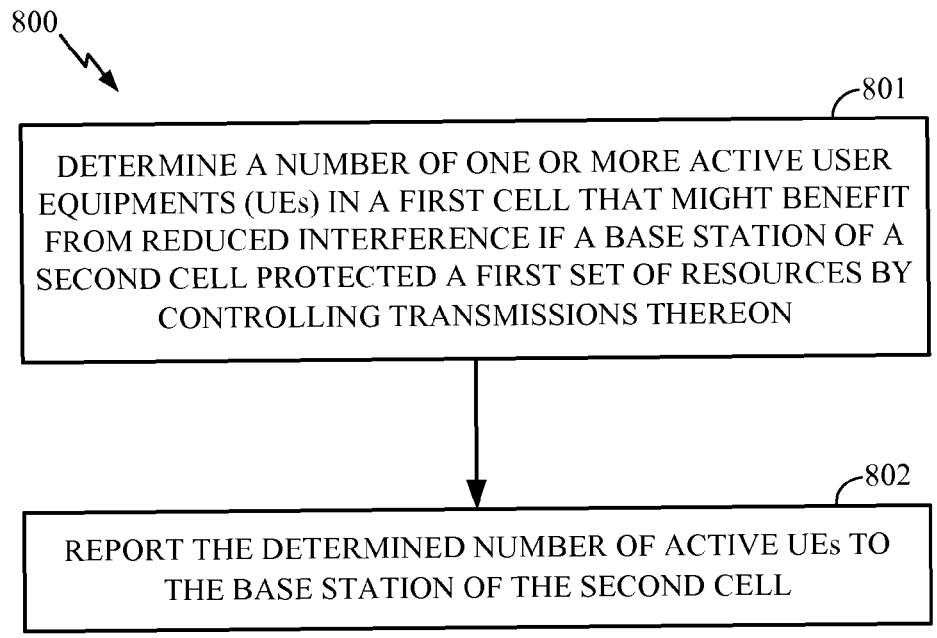
FIG. 8 illustrates example operations for determining number of protected active users that may be performed by a base station of a victim cell, in accordance with certain aspects of the present disclosure.

FIG. 8 illustrates example operations 800 for determining number of protected active users, in accordance with certain aspects of the present disclosure. The operations may be performed, for example, by a base station of a "victim" cell (e.g., a first cell such as the pico cell 110x in FIG. 1) that serves UEs potentially interfered by transmissions of an "aggressor" cell (e.g., a second cell such as the macro cell 110b in FIG. 1).

At 802, the base station of the first cell determines a number of one or more active user equipments (UEs) in the first cell that might benefit from reduced interference if a base station of a second cell protected a first set of resources by controlling transmissions thereon. For example, the base station may count the UEs in the first cell that are strongly interfered by transmissions in the second cell. The base station may also determine whether a strong interference condition exists for each UE based on at least two channel quality information transmitted by the UE referring to both protected and unprotected resources. At 804, the base station of the first cell reports the determined number of active UEs to the base station of the second cell.

Figure 9:
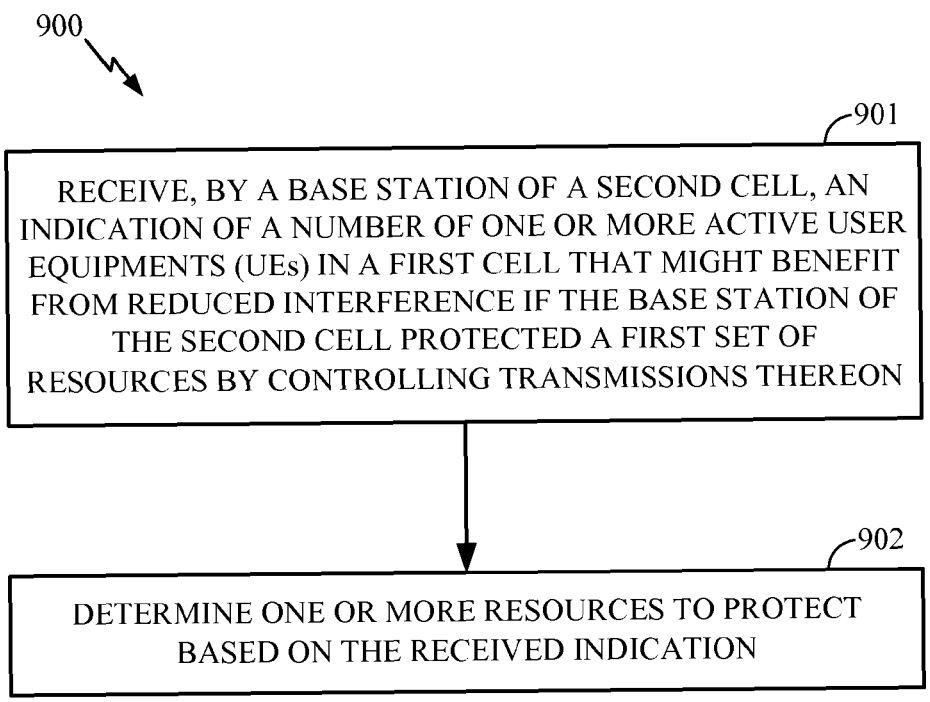
FIG. 9 illustrates example operations for determining number of protected resources that may be performed by a base station of an aggressor cell, in accordance with certain aspects of the present disclosure.

FIG. 9 illustrates example operations for determining number of protected resources, in accordance with aspects of the present disclosure. The operations 900 may be performed, for example, by a base station of an aggressor cell (e.g., a second cell such as the macro cell 110b in FIG. 1).

At 902, the base station of the second cell receives an indication of a number of one or more active user equipments (UEs) in a first cell (e.g., the victim cell such as the pico cell 110x in FIG. 1) that might benefit from reduced interference if the base station of the second cell protected a first set of resources by controlling transmissions thereon. The indication may be provided in a resource status update message and/or over an X2 communications link.

At 904, the base station of the second cell determines one or more resources to protect based on the received indication. For example, the base station of the second cell may compare the indicated number of active UEs with a number of UEs in the second cell. The comparison may be carried out if protected resources in the second cell are overloaded. For some aspects, the base station may attempt to equalize average resources per UE across the first cell and the second cell. For another aspect, the base station of the second cell may determine one or more resources to protect based, at least in part, on a downlink almost blank subframe (ABS) status information element (IE) indicating an overload of the protected resources.

For certain aspects, the base station of the second cell may determine number of protected resources (and their location) based on parameters of the system (e.g., number of UEs served by the second cell, QoS requirements and type of traffic for each UE, and the like), and the received indication of the number of active users in the first cell. The number and location of the protected resources may be determined dynamically or semi-statically.

The various operations of methods described above may be performed by any suitable means capable of performing the corresponding functions. The means may include various hardware and/or software component(s) and/or module(s), including, but not limited to a circuit, an application specific integrate circuit (ASIC), or processor.

For example, means for determining number of one or more active (UEs) may include any suitable processing element such as the processor 440 as illustrated in FIG. 2. Similarly, means for evaluating, means for identifying, means for comparing, means for counting, means for applying a threshold, and means for attempting to equalize average resources may include any suitable processing element such as the processor 440 as illustrated in FIG. 2. Means for reporting the determined number of active UEs may include any suitable reporting element or transmitter such as the antenna 434a as illustrated in FIG. 2. In addition, means for receiving may include any suitable receiving component or receiver such as the antenna 434a as illustrated in FIG. 2.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wireless communications, comprising:
    determining a number of one or more active user equipments (UEs) in a first cell for which interference would be reduced if a base station of a second cell protected a first set of resources, wherein the determined number of the one or more active UEs comprises only those UEs whose interference from transmissions from the base station of the second cell is greater than a threshold; and
    reporting, over a direct base station-to-base station communications link, the determined number of active UEs to the base station of the second cell.

2. The method of claim 1, wherein the determining comprises determining a difference, for each of a plurality of UEs, in reference signal received power (RSRP) between the first cell and the second cell.

3. The method of claim 1, further comprising determining whether a strong interference condition exists for each UE based on at least two channel quality information transmitted by said UE referring to both protected and unprotected resources.

4. The method of claim 1, wherein the determining comprises determining the number of active UEs for each of a plurality of different Quality of service Class Identifiers (QCIs).

5. The method of claim 1, wherein the determining comprises identifying at least one of:
    UEs whose downlink performance is limited by a current number of protected resources; or
    UEs whose Quality of Service (QoS) constraints are not achieved by the current number of protected resources.

6. The method of claim 5, wherein the downlink performance is measured by at least one of throughput or delay.

7. The method of claim 5, wherein the QoS constraints are specified by at least one of throughput or delay.

8. The method of claim 1, wherein the determining comprises evaluating physical resource block (PRB) usage of one or more active UEs needing protection.

9. The method of claim 8, wherein the evaluating is done during a measurement window.

10. The method of claim 8, further comprising applying a threshold to the evaluated PRB usage and identifying the one or more active UEs based on an application.

11. The method of claim 1, wherein the determined number of active UEs is reported in a resource status update message.

12. A method for wireless communications, comprising:
    receiving, by a base station of a second cell over a direct base station-to-base station communications link, an indication of a number of one or more active user equipments (UEs) in a first cell for which interference would be reduced if the base station of the second cell protected a first set of resources, wherein the indicated number of the one or more active UEs comprises only those UEs whose interference from transmissions from the base station of the second cell is more than; and
    determining one or more resources to protect based on the received indication.

13. The method of claim 12, wherein the indication is provided in a resource status update message.

14. The method of claim 12, wherein the determining comprises comparing the indicated number of active UEs with a number of UEs in the second cell.

15. The method of claim 14, wherein the determining comprises attempting to equalize average resources per UE across the first cell and the second cell.

16. The method of claim 14, wherein the determining is based, at least in part, on a downlink almost blank subframe (ABS) status information element (IE) indicating an overload of the protected resources.

17. The method of claim 14, wherein the comparing is carried out if protected resources in the second cell are overloaded.

18. An apparatus for wireless communications, comprising:
- means for determining a number of one or more active user equipments (UEs) in a first cell for which interference would be reduced if a base station of a second cell protected a first set of resources, wherein the determined number of the one or more active UEs comprises only those UEs whose interference from transmissions from the base station of the second cell is more than a threshold; and
- means for reporting, over a direct base station-to-base station communications link, the determined number of active UEs to the base station of the second cell.

19. An apparatus for wireless communications, comprising:
- means for receiving, by an apparatus in a second cell over a direct base station-to-base station communications link, an indication of a number of one or more active user equipments (UEs) in a first cell for which interference would be reduced if the apparatus protected a first set of resources, wherein the indicated number of one or more active UEs comprises only those UEs whose interference from transmissions from the apparatus of the second cell is more than a threshold; and
- means for determining one or more resources to protect based on the received indication.

20. A non-transitory computer readable medium for wireless communications, the non-transitory computer readable medium having instructions stored thereon, the instructions being executable by one or more processors and the instructions comprising:
- instructions for determining a number of one or more active user equipments (UEs) in a first cell for which interference would be reduced if a base station of a second cell protected a first set of resources, wherein the determined number of the one or more active UEs comprises only those UEs whose interference from transmissions from the base station of the second cell is more than a threshold; and
- instructions for reporting, over a direct base station-to-base station communications link, the determined number of active UEs to the base station of the second cell.

21. A non-transitory computer readable medium for wireless communications, the non-transitory computer readable medium having instructions stored thereon, the instructions being executable by one or more processors and the instructions comprising:
- instructions for receiving, by a base station of a second cell over a direct base station-to-base station communications link, an indication of a number of one or more active user equipments (UEs) in a first cell for which interference would be reduced if the base station of the second cell protected a first set of resources, wherein the indicated number of the one or more active UEs comprises only those UEs whose interference from transmissions from the base station of the second cell is more than a threshold; and
- instructions for determining one or more resources to protect based on the received indication.

22. An apparatus for wireless communications, comprising:
- at least one processor configured to:
  - determine a number of one or more active user equipments (UEs) in a first cell for which interference would be reduced if a base station of a second cell protected a first set of resources, wherein the determined number of the one or more active UEs comprises only those UEs whose interference from transmissions from the base station of the second cell is more than a threshold; and
  - report, over a direct base station-to-base station communications link, the determined number of active UEs to the base station of the second cell; and
- a memory coupled to the at least one processor.

23. An apparatus for wireless communications, comprising:
- at least one processor configured to:
  - receive, by the apparatus in a second cell over a direct base station-to-base station communications link, an indication of a number of one or more active user equipments (UEs) in a first cell for which interference would be reduced if the apparatus of the second cell protected a first set of resources, wherein the indicated number of the one or more active UEs comprises only those UEs whose interference from transmissions from the base station of the second cell is more than a threshold; and
  - determine one or more resources to protect based on the received indication; and
- a memory coupled to the at least one processor.

24. The apparatus of claim 22, wherein the determining comprises determining a difference, for each of a plurality of UEs, in reference signal received power (RSRP) between the first cell and the second cell.

25. The apparatus of claim 22, further comprising determining whether a strong interference condition exists for each UE based on at least two channel quality information transmitted by said UE referring to both protected and unprotected resources.

26. The apparatus of claim 22, wherein the determining comprises determining the number of active UEs for each of a plurality of different Quality of service Class Identifiers (QCIs).

27. The apparatus of claim 22, wherein the determining comprises identifying at least one of:
- UEs whose downlink performance is limited by a current number of protected resources; or
- UEs whose Quality of Service (QoS) constraints are not achieved by the current number of protected resources.

28. The apparatus of claim 27, wherein the downlink performance is measured by at least one of throughput or delay.

29. The apparatus of claim 27, wherein the QoS constraints are specified by at least one of throughput or delay.

30. The apparatus of claim 22, wherein the determining comprises evaluating physical resource block (PRB) usage of one or more active UEs needing protection.

31. The apparatus of claim 30, wherein the evaluating is done during a measurement window.

32. The apparatus of claim 30, further comprising applying a threshold to the evaluated PRB usage and identifying the one or more active UEs based on an application.

33. The apparatus of claim 22, wherein the determined number of active UEs is reported in a resource status update message.

34. The apparatus of claim 23, wherein the determining comprises comparing the indicated number of active UEs with a number of UEs in the second cell.

35. The apparatus of claim 34, wherein the determining comprises attempting to equalize average resources per UE across the first cell and the second cell.

36. The apparatus of claim 34, wherein the determining is based, at least in part, on a downlink almost blank subframe (ABS) status information element (IE) indicating an overload of the protected resources.

37. The apparatus of claim 34, wherein the comparing is carried out if protected resources in the second cell are overloaded.

38. The apparatus of claim 23, wherein the indication is provided in a resource status update message.

\* \* \* \* \*